United States Patent [19]

Yoshida

[11] 4,168,727

[45] Sep. 25, 1979

[54] WHIPPED CREAM MAKING MACHINE HAVING A PLATFORM ARRANGEMENT

[75] Inventor: Mitsunobu Yoshida, Tenri, Japan

[73] Assignees: Sharp Kabushiki Kaisha, Osaka; Kabushiki Kaisha Takarabune, Kyoto, both of Japan

[21] Appl. No.: 867,518

[22] Filed: Jan. 6, 1978

[30] Foreign Application Priority Data

Mar. 7, 1977 [JP] Japan .................................. 52-25305

[51] Int. Cl.$^2$ .............................................. B65B 3/26
[52] U.S. Cl. ..................................... 141/270; 261/28; 366/101
[58] Field of Search ................... 261/DIG. 7, 140, 28; 366/101, 102, 339; 141/250–284, 172, 11, 69

[56] References Cited

U.S. PATENT DOCUMENTS

| | | | |
|---|---|---|---|
| 3,758,080 | 9/1973 | MacManus | 261/28 |
| 4,041,995 | 8/1977 | Columbus | 141/275 |

*Primary Examiner*—Houston S. Bell
*Attorney, Agent, or Firm*—Birch, Stewart, Kolasch & Birch

[57] ABSTRACT

A whipped cream making machine comprising a fixed whipping barrel, having a substantially labyrinth passage defined therein, to which a liquid milk product is supplied under pressure after having been sucked by and mixed with a gas in a suction pump. The liquid milk product mixed with air is emulsified as it flows through the labyrinth passage in the fixed whipping barrel and then is supplied towards a rotary whipping barrel having therein a stirring rod rotatable about its longitudinal axis. The emulsified milk product is stirred so that it can further be emulsified during its flow through the rotary whipping barrel. The machine further comprises a platform arrangement for the support of an article to be decorated with the whipped cream discharged from a dispensing nozzle of the whipping machine. The platform arrangement includes either or both a mechanism for moving the platform in a circular path and/or a mechanism for reciprocating the platform so that it reciprocately moves in a radial direction with respect to the circular path along which the platform is moved.

19 Claims, 8 Drawing Figures

WHIPPED CREAM MAKING MACHINE HAVING A PLATFORM ARRANGEMENT

BACKGROUND OF THE INVENTION

The present invention generally relates to a whipping machine for making an emulsified or foam product and, more particularly, to a whipping machine of a type having a platform arrangement for the support of an article to be decorated with the emulsified or foam product produced thereby.

It is generally well known that whipped cream can be manufactured by forcing air and a liquid milk product, such as cream, simultaneously through a whipping means having such a large surface area of contact as to provide substantial agitation and intimate intermingling of the air and the cream. A conventional whipping machine performing this method comprises a refrigerator-cooled cream tank and an emulsifying or whipping barrel to which cream within the cream tank is supplied under pressure by means of a gear pump after it has been intermingled with air during the passage thereof through the gear pump. The emsulifying barrel comprises a hollow cylindrical shell having an emulsifying chamber in which an elongated deflector assembly generally complemental in shape to the shape of the emulsifying chamber is accommodated. The deflector assembly is so designed as to provide a substantially labyrinth passage through which a mixture of air and cream flows in a substantially zig-zag manner. It is during the flow through the labyrinth passage that the air and the cream are agitated and intermingled with each other to form an emulsion of air and cream which ultimately emerges outside of the machine in the form of a whipped cream from a dispensing spout coupled to the emulsifying barrel through a dispensing valve assembly.

The prior art whipped cream making machine is satisfactory in that whipped cream can be manufactured. However, it has been found that, since the extent to which the air and the cream are agitated and intermingled is insufficient, they tend to be insufficiently homogenized, the consequence of which is that not only does the resultant whipped cream occassionally bubble out from the dispensing spout during discharge thereof, but also the resultant whipped cream contains relatively large and irregular bubbles.

In view of the above, an improved version of whipped cream making machine has been proposed, the construction of which is disclosed in the U.S. Pat. application Ser. No. 836,716, filed on Sept. 26, 1977, and now U.S. Pat. No. 4,144,293, and assigned to the assignees of the present invention. According to the U.S. Pat. application, the improved whipped cream making machine comprises a housing structure including a container for accommodating a predetermined amount of liquid milk product, a gear pump, a first whipping barrel having a substantially labyrinth passage defined therein and extending over the entire length of the first whipping barrel. A mixture of air and liquid milk product is supplied from the container towards the fist whipping barrel under pressure by means of the gear pump, and is emulsified during its passage through the labyrinth passage in the first whipping barrel. A second whipping barrel is provided having therein means for stirring the emulsified mixture during the passage therethrough of said emulsified mixture. In addition a dispensing valve assembly is provided including a dispensing nozzle through which the emulsified mixture is discharged to the outside of the housing structure. Further a drive mechanism is provided for driving the gear pump and also for driving the stirring means in the second whipping barrel.

In the improved whipped cream making machine or whipping machine, the first and second whipping barrels are so coupled to each other that the emulsified mixture emerging from the first whipping barrel can be continuously supplied onto the second whipping barrel under pressure. The emulsified mixture so supplied onto the second whipping barrels flows through the interior of the second whipping barrel under pressure imparted by the gear pump and, at the same time, is stirring by the stirring means, driven by the drive mechanism, to provide a highly homogenized emulsion. The highly homogenized emulsion is then discharged to the outside from the dispensing nozzle in the form of a whipped cream.

Irrespective of the construction of the whipping machine, a whipped cream produced by the whipping machine is applied to a confectionary product, such as a cake or a pastry, to form a cream decoration. For applying the whipped cream to the confectionary product, for example, the cake, in a predetermined configuration or pattern to form a good-looking cream decoration on the cake, a manipulatable dispensing device has heretofore been employed, which is separate of the whipping machine. One type of manipulatable dispensing device comprises a substantially conical container made of flexible sheet material and having a dispensing nozzle or a pattern former positioned at the apex portion. The container is adapted to accommodate a definite amount of whipped cream discharged from the dispensing nozzle assembly of the whipping machine. The whipped cream within the container of the manipulatable dispensing device is, as the container is squeezed, discharged through the dispensing nozzle or pattern former. By manually moving the manipulatable dispensing device in a predetermined configuration or pattern above one surface of the cake to be decorated with the whipped cream, while the container of the manipulatable dispensing device is at the same time squeezed, the cream decoration can be formed.

As has been experienced, transfer of the whipped cream from the whipping machine to the container of the manipulatable dispensing device is inconvenient and time-consuming and often hampers decoration of a plurality of cakes with cream embelishments in a relatively short period of time. Moreover, as the residue of whipped cream within the container of the manipulatable dispensing device diminish, the amount of the whipped cream being discharged through the dispensing nozzle or pattern former tends to diminish unless the whipped cream is replenished and/or the pressure applied to the container so as to squeeze the latter is adequately adjusted. Therefore a good-looking cream decoration can hardly be formed on the cake without the skill required.

SUMMARY OF THE INVENTION

Accordingly, the present invention has been made to substantially eliminate the disadvantages and inconveniences inherent in the conventional art of decorating cakes with cream embelishments and has for its essential object to provide an improved whipping machine having incorporated therein a platform arrangement for the support of an article to be decorated immediately below a dispensing spout of the whipping machine.

Another essential object of the present invention is to provide an improved whipping machine of the type referred to above, with which the article to be decorated can be readily and effectively trimmed with cream embelishments upon placement of the article on the platform and without substantially requiring the intervention of hand labor.

A further object of the present invention is to provide an improved whipping machine of the type referred to above, capable of producing articles with cream decoration thereon which are pleasant and fancy to see.

A whipping machine which is utilized in the practice of the present inventin comprises a housing structure including a container for accommodating therein a liquid milk product, a first whipping barrel having a substantially labyrinth passage defined therein and extending over the entire length of the first whipping barrel, are means for supplying the milk product within the container to the first whipping barrel so as to flow through the labyrinth passage under pressure so that the milk product so supplied can be mixed with air and subsequently emulsified as the mixture of the milk product with the air flows under pressure through the labyrinth passage. A second whipping barrel is coupled to the first whipping barrel for receiving the emulsified mixture from the first whipping barrel and having therein means for stirring the emulsified mixture during the continued passage of the latter therethrough. In addition, a dispensing valve assembly is provided including a dispensing nozzle through which the emulsified mixture is discharged to the outside of the housing structure, and a drive mechanism for driving the stirring means in the second whipping barrel.

The construction of the whipping machine so far described above is substantially identical with that disclosed in the aforementioned copending U.S. Pat. application.

However, according to the present invention, the whipping machine of the construction described above is incorporated therein with a platform arrangement which comprises a platform positioned immediately below the dispensing spout for movement between up and down positions in a direction close to and away from the dispensing spout and adapted to support thereon an article to be decorated, for example, a cake, and means for moving the platform between the up and down positions.

In order to impart a variation in shape of the cream decoration of the cake, in accordance with the teachings of the present invention, the whipping machine having the platform arrangement of the construction so far described above may have means for rotating the dispensing spout about its own longitudinal axis.

Furthermore, irrespective whether or not the whipping machine has a spout rotating means incorporated therein, the platform arrangement may further comprise either or bothn a means for rotating the platform about its own center and or a means for moving the platform so as to travel in a circular path in a plane parallel to the plane of the platform support surface.

BRIEF DESCRIPTION OF THE DRAWING

These and other objects and features of the present invention will become apparent from the following description taken in conjunction with preferred embodiments thereof with reference to the accompanying drawings, in which.

Figure 4:
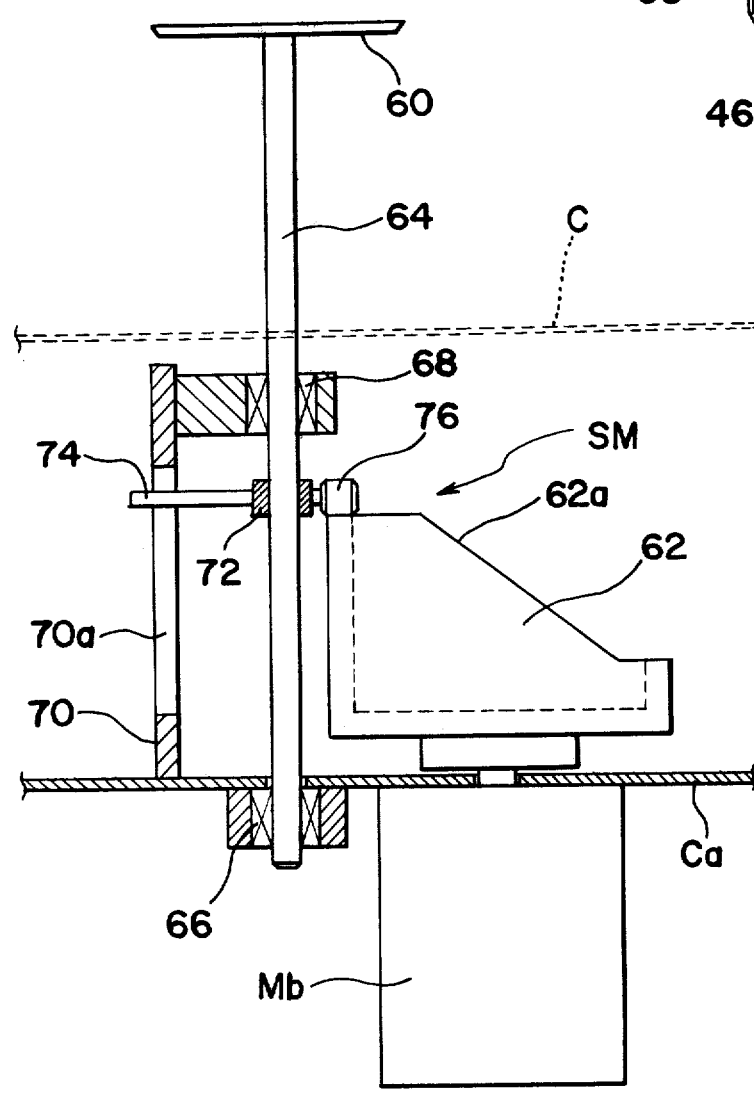
Figure 5:
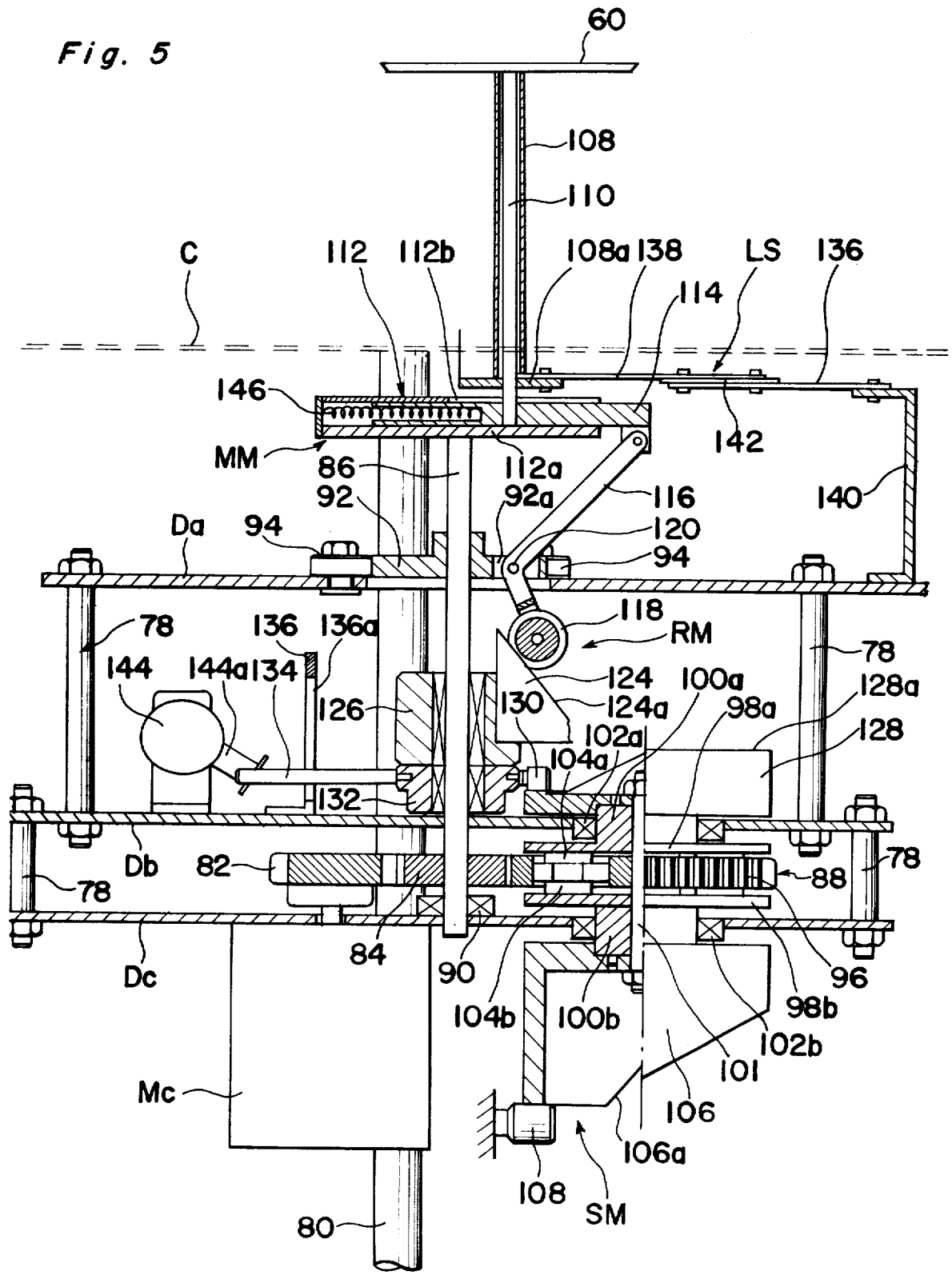
Figure 6:
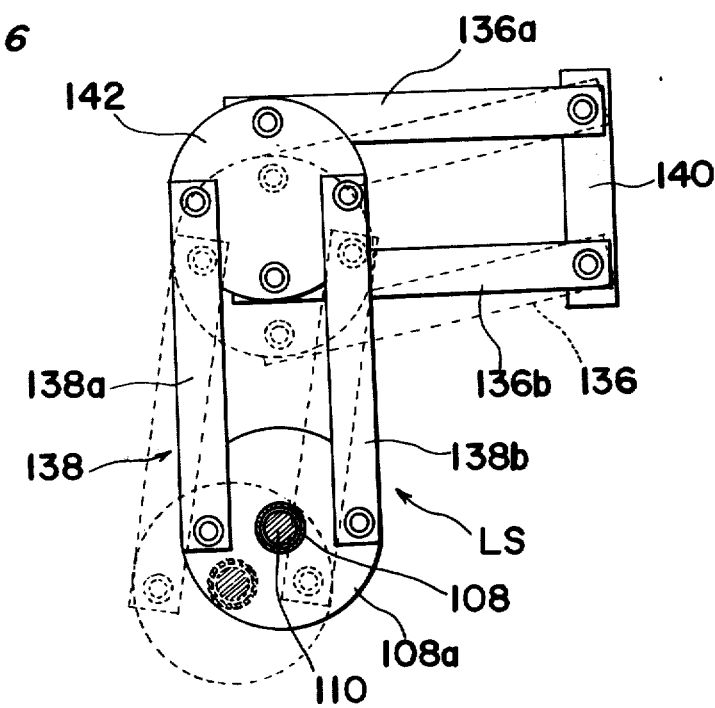
Figure 7:
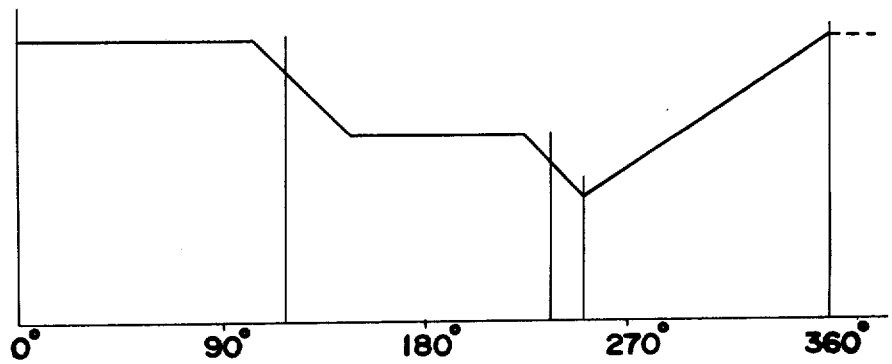
Figure 8:
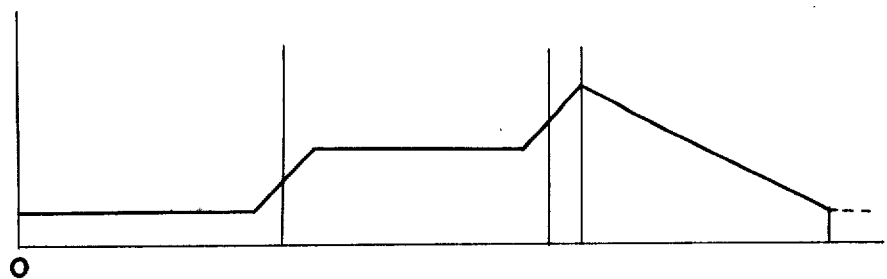

FIG, 3 is a side view, on an enlarged scale, of an essential portion of a dispensing nozzle assembly, the right-hand portion of the dispensing nozzle assembly being shown in section;

FIG. 4 is a schematic side view of a platform arrangement according to one preferred embodiment of the present invention;

FIG. 5 is a view similar to FIG. 4, showing another preferred embodiment of the present invention;

FIG. 6 is a top plan view, on an enlarged scale, showing a guide linkage system employed in the platform arrangement shown in FIG. 5;

FIG. 7 is a chart illustrating the path of vertical movement of the platform in a direction close to and away from the dispensing nozzle assembly, which is determined by the shape of an up-down shift cam employed in the platform arrangement shown in FIG. 5; and FIG. 8 is a chart illustrating the path of vertical movement of a guide block, employed in the platform arrangement shown in FIG. 5, for ultimately varying the position of the center of the platform in a radial direction, determined by the shape of a control cam.

DETAILED DESCRIPTION OF THE EMBODIMENTS

Before the description of the present invention proceeds, it is to be noted that like parts are designated by like reference numerals throughout the accompanying drawings.

Figure 1:
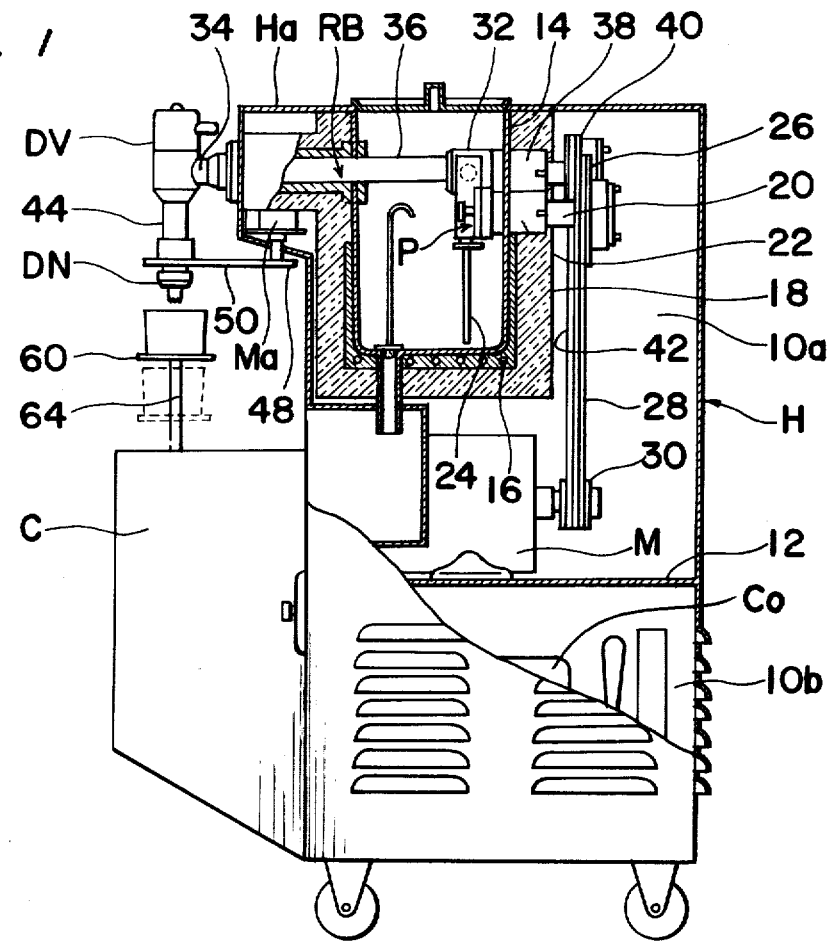
FIG. 1 is a schematic side sectional view of a whipping machine, embodying the present invention.
Figure 2:
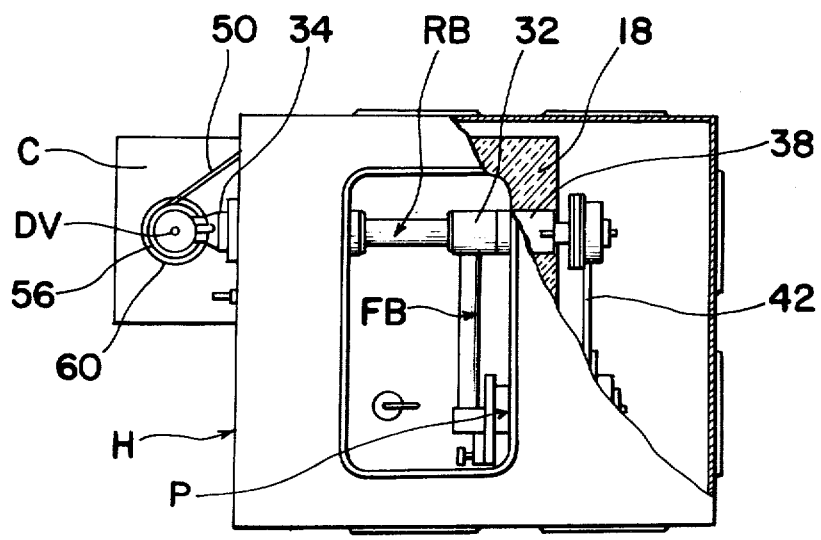
FIG. 2 is a top plan view, with a portion broken away and a tank cover removed, of the whipping machine shown in FIG. 1.

Referring first to FIGS. 1 and 2, a whipping machine comprises a housing structure H divided into upper and lower compartments, 10a and 10b by a partition wall 12. Within the upper compartment 10a, a cream tank 14 is supported firmly in position in any known manner and has its top opening upwards. An evaporator 16, shown in the form of a cooling coil, is arranged externally of the bottom of the cream tank 14 and is operatively coupled to a compressor Co, housed within the lower compartment 10b, in a manner well known to those skilled in the art.

In the construction so far described, the cream tank 14 is cooled by a cooling medium flowing in a circulating path including the evaporator 16 and the compressor Co. Such a cooling system is well known and may be of any known construction and, therefore, the details thereof are herein omitted for the sake of brevity.

Externally surrounding the cream tank 14 except for the top opening of the tank 14 is a heat insulating layer 18, the purpose for which it is employed being well known to those skilled in the art.

The whipping machine further comprises a suction pump P, for example, a gear pump, which has a drive shaft 20 and is positioned within the cream tank 14 with its drive shaft 20 rotatably supported by a bearing sleeve 22 in a watertight manner. The said bearing sleeve 22 extends completely through the heat insulating layer 18 in parallel relationship to the plane of the bottom of the cream tank 14. As is well known to those skilled in the art, the suction pump P generally employed in a whipping machine is of such a construction that a fluid medium sucked into a gear chamber through a suction port is mixed with gaseous medium, for example, air, which is introduced into the gear chamber through an air intake port, and then discharged under pressure to the outside of the pump housing through a discharge port.

With the above in mind, extending downwards from the suction port of the suction pump P is a suction pipe 24 which, when and so long as the suction pump P, sucks the liquid milk product, that is, cream, within the cream tank 14 towards the gear chamber of the suction pump P.

The drive shaft 20 of the suction pump P has a driven pulley 26 rigidly mounted on a free end thereof and situated externally of the cream tank 4. The said driven pulley 26 is operatively coupled to a drive motor M by way of a substantially endless transmission member 28, for example, an endless belt, which is trained over the driven pulley 26 and a drive pulley 30 rigidly mounted on a drive shaft of the motor M.

As best shown in FIG. 2, extending outwards from the suction pump P in a direction perpendicular to the longitudinal axis of the shaft 20 and also perpendicular to the longitudinal axis of the suction pipe 24 is a fixed whipping barrel FB which has one end tightly received in the discharge port of the suction pump P and the other end coupled to a rotary whipping barrel RB in a manner as will be described later. The fixed whipping barrel may be of any known construction having a substantially labyrinth passage defined therein and extending over the entire length of said fixed whipping barrel FB, and is so designed that the mixture of air and cream, which has been supplied under pressure into the fixed whipping barrel from the suction pump P, can be emulsified during its passage or flow through the substantially labyrinth passage.

The rotary whipping barrel RB has one end coupled to the fixed whipping barrel FB by means of a coupling member 32 and the other end coupled to dispensing valve assembly DV positioned externally of the housing structure H and connected thereto through a coupling sleeve 34. A substantially intermediate portion of said rotary whipping barrel RB extends at right angles to the longitudinal axis of the fixed whippping barrel FB and in parallel relationship to the bottom of the cream tank 14. The structural and functional details of the rotary whipping barrel RB are disclosed in the aforementioned copending U.S. patent application and is to be understood as comprising a hollow cylindrical shell 36 and a rotary stirring rod (not shown) rotatably extending within the hollow of the shell 36 over the entire length of said shell 36 and having a plurality of stirring elements rigidly mounted on or otherwise integrally formed with the peripheral surface of the stirring rod. The stirring rod within the hollow of the cylindrical shell 36 has one end rotatably extending through the coupling member 32 and, then, through a bearing sleeve 38, which extends through the heat insulating layer 18 in parallel relationship to the bearing sleeve 22, and having a driven pulley 40 rigidly mounted on said one end of the stirring rod. The drive pulley 30 on the motor drive shaft is of a type having a pair of grooves, one having the transmission member 28 positioned therein and the second having transmission member 42. The transmission member 42 is similar in construction to the transmission member 28 and is trained around the driven pulley 40 and the drive pulley 30 with a portion of the transmission member 42 received in the second of the grooves in the drive pulley 30.

In any event, the rotary whipping barrel RB is so designed that, subsequent to entry of the emulsified mixture from the fixed whipping barrel FB into the hollow of the rotary whipping barrel RB and during rotation of the stirring rod about its own longitudinal axis driven by the motor M, the emulsified mixture can be positively stirred to further homogenize the emulsified mixture during its flow from one end, adjacent the coupling member 32, towards the other end of the barrel RB.

The dispensing valve assembly DV has a discharge passge (not shown) of substantially inverted L-shape, having one end in communication with the hollow of the rotary whipping barrel RB through the coupling sleeve 34 and the other end in communication with a dispensing spout downwardly extending therefrom, and includes a shut-off valve mechanism (not shown) of, for example, electromagnetically operated type supported in position for selectively opening and closing the discharge passage in the dispensing valve assembly DV.

The whipping machine of the construction so far described above is detailed and disclosed in the aforementioned copending U.S. application and operates in the following manner.

Assuming that the cream is accommodated within the cream tank 14 and upon subsequent energization of the motor M, the suction pump P is operated to suck the cream into the suction pipe 24, and, then, into the fixed whipping barrel FB via the gear chamber of the suction pump P. The cream is, after having mixed with air during its flow through the gear chamber of the suction pump P, fed under pressure through the fixed whipping barrel FB whereat the mixture of the cream and the air is emulsified as it pass through the labyrinth passage in the fixed whipping barrel FB. The emulsified mixture is then supplied under pressure through the coupling member 32 into the rotary whipping barrel RB whereat the emulsified mixture is positively stirred by the rotary stirring rod, then rotated by the motor M about its own longitudinal axis, so that the emulsified mixture can be further homogenized.

When the dispensing valve assembly DV is operated to open the discharge passage defined therein simultaneously with or subsequent to energization of the motor M, the emulsified mixture so stirred within the rotary whipping barrel RB is allowed to flow towards the dispensing spout 44 past the shut-off valve mechanism incorporated in the dispensing valve assembly. The emulsified mixture is ultimately discharged to the outside through a nozzle assembly DN in the form of a whipped cream.

In accordance with the present invention, the dispensing nozzle assembly, generally designated by DN, includes a dispensing nozzle 46, rotatably connected to the lower free end of the dispensing spout 44, and means for rotating the dispensing nozzle 46 about the longitudinal axis of the spout 44. The nozzle rotating means comprises an electrically operated drive motor Ma having a drive shaft on which a drive pulley 48 is rigidly mounted. The drive pulley 48 in turn is operatively coupled to the nozzle assembly DN through a substantially endless belt 50 in a manner as will subsequently be described.

As best shown in FIG. 1, the drive motor Ma for rotating the dispensing nozzle 46 is housed in an overhang portion Ha of the housing structure H which protrudes outwards from one of the side walls of the housing structure H facing the dispensing valve assembly DV and which extends widthwise of said one of the side walls of the housing structure H adjacent the top of the housing structure H. Although not shown, for the purpose of safety, the endless belt 50 and its associated movable parts may be protected from the acess of the hands of an operator of the whipping machine in any suitable manner known to those skilled in the art, for example, by the use of a belt casing.

Figure 3:
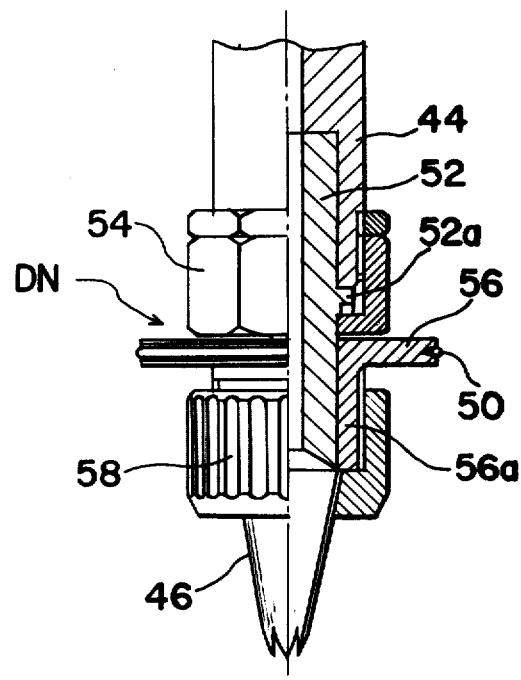

Referring to FIGS. 1 and 3, there is illustrated the details of the nozzle assembly DN. The nozzle assembly DN comprises a support sleeve 52 having a radially outwardly protruding collar 52a, formed on a substantially intermediate portion thereof, and having one end portion removably inserted into the spout 44. This support sleeve 52 is supported in position relative to the spout 44 by an apertured box nut 54 through which the other end portion of the support sleeve 52 rotatably extends outwards. The box nut 54 is externally threaded to the free end of the spout 44 remote from the valve assembly DV with the radially outwardly protruding collar 52a slidingly sandwiched between an annular end face at the free end of the spout 44 and the box nut 54. The nozzle assembly DN further comprises a driven pulley 56 having an axially extending flange 56a integral therewith and rigidly mounted on, or otherwise pressure fitted to, the other end portion of the support sleeve 52 with the pulley 56 located adjacent the box nut 54.

The dispensing nozzle 46 is detachably connected to the support sleeve 52 in an axially aligned manner by means of a box nut 58 threaded to the axial flange 56a of the pulley 56 which is affixed to the support sleeve 52.

From the foregoing, it will readily be seen that, when and so long as a rotational force is transmitted to the pulley 56 from the motor Ma through the belt 50, the support sleeve 52 and the dispensing nozzle 46 can be rotated together about the longitudinal axis of the spout 44.

Furthermore, irrespective of the employment of the rotary dispensing nozzle assembly DN as best shown in FIG. 3, the whipping machine of the construction hereinbefore described has, in accordance with the present invention, a platform arrangement incorporated therein. The platform arrangement in its simplified form comprises, as best shown in FIG. 4, a disc-shaped platform 60, positioned immediately below the dispensing nozzle assembly DN, and an up-down shift mechanism generally indicated by SM and housed within a casing C secured to the one side wall of the housing H and at a position below the dispensing nozzle assembly DN.

Referring now to FIG. 4, the up-down shift mechanism SM comprises a chassis Ca, forming a part of the casing C and positioned inside of the casing C, a drive motor Mb having a drive shaft (not shown) and secured to the undersurface of the chassis Ca with its drive shaft upwardly extending through the chassis Ca. The up-down shift mechanism SM further comprises a substantially drum-shaped cam assembly 62 having one end closed and the other end formed into a cam edge 62a of a shape as will be described later. This cam assembly 62 is positioned above the chassis Ca and is adapted to be rotated by the motor Mb with the closed end of said cam assembly 62 rigidly mounted on the drive shaft of the motor Mb.

The platform 60 is rigidly mounted on one end extremity of a support rod 64, the other end extremity of said support rod 64 being axially slidably received by a bearing 66 secured to the chassis Ca. A substantially intermediate portion of the support rod 64 extendsa axially and slidably through an intermediate bearing 68, which is supported above the chassis Ca by a slotted support member 70, and has a fixture 72 rigidly mounted thereon and positioned intermediately between the chassis Ca and the bearing 68. The fixture 72 is employed for the purpose of rigidly connecting a guide rod 74 extending at right angles to the support rod 64 and having one end loosely inserted through a slot 70a in the support member 70. The other end of the guide rod 74 remote from the slotted support member 70 has a roller 76 rotatably mounted thereon, said roller 76 being mounted at any point on the circular cam edge 62a of the cam assembly 62.

The cam edge 62a of the cam assembly 62 is so shaped that, during one complete rotation of the cam assembly 62 in one direction about the motor drive shaft, the support rod 64 and, therefore, the platform 60 for the support of a cake to be decorated with the whipped cream, can be moved up and down in one or more reciprocations depending upon the shape of the cam edge 62a with the roller 76 constantly engaged on the cam edge 62a.

Where the up-down shift mechanism SM of the construction as best shown in FIG. 4 is incorporated in the whipping machine, the concurrent employment of the rotary dispensing nozzle assembly DN of the construction as best shown in FIG. 3 is recommended or preferred.

In the embodiment shown in FIGS. 5 and 6, the platform arrangement includes, in addition to the up-down shift mechanism SM, a mechanism for moving the platform 60 in a circular path so that the point of deposit of the whipped cream, which is discharged and falls by gravity from the dispensing nozzle assembly DN, on one surface of the cake facing towards the dispensing nozzle assembly DN varies circularly with respect to such surface of the cake. In addition a mechanism is provided for reciprocating the platform 60 during the continued movement of the platform 60 in the circular path so that the point of deposit of the whipped cream on the surface of the cake varies radially with respect to the surface of the cake.

Referring now to FIGS. 5 and 6, the mechanism for moving the platform 60 in the circular path is generally designated by MM and the mechanism for reciprocating the platform 60 is generaly designated by RM.

The up-down shift mechanism SM shown in FIG. 5 comprises first, second and third decks Da, Db and Dc positioned one above the other and connected to each other in spaced relationship by means of a plurality of connecting members, such as spacer bolts and nuts, generally designated by 78, in a manner known to those skilled in the art. The triplex-decker, that is, a combination of the first to third decks Da, Db and Dc, is supported within the casing C by one or more guide posts 80 for movement between lifted and lowered positions in a direction close to and away from the dispensing nozzle assembly DN and parallel to the longitudinal axis of the guide posts 80. It is to be noted that, where the number of the guide posts 80 is one, the triplx-decker and the guide post 80 should be so arranged that the triplex-decker will not rotate or will not be rotated about the longitudinal axis of the guide post 80, such arrangement being well known to those skilled in the art. It is also to be noted that the guide post or posts 80 are rigidly erected within the casing C so as to extend vertically.

The up-down shift mechanism SM further comprises a drive unit including an electrically operated motor Mc rigidly secured to the undersurface of the third deck Dc and having a drive gear 82 rigidly mounted on a drive shaft of the motor Mc, said drive gear 82 being positioned within a space which is defined between the second and third decks Db and Dc. The drive gear 82 is held in constantly meshed relationship to an intermediate gear 84 rigidly mounted on a support shaft 86 and in turn operatively coupled to a clutch wheel assembly 88 in a manner as will be described later.

The support shaft 86 having one end journalled by a bearing 90 rigidly mounted on the third deck Dc extends through the second and first decks Db and Da and has a carriage rigidly mounted on the other end thereof. It is to be noted that the carriage of a construction, which will be described later, forms a part of the moving mechanism MM, including the support shaft 86, on one hand and also a part of the platform reciprocating mechanism RM on the other hand. The support shaft 86 also has a carrier wheel 92 rigidly mounted thereon at a position substantially intermediately of the length of the support shaft 86 and positioned above the first deck Da, which is so held in position by three or more rollers 94, rotatably mounted on the first deck Da in angularly spaced relationship to each other with respect to the longitudinal axis of the support shaft 86 and contacting the outer peripheral surface of the carrier wheel 92, so that the support shaft 86 will neither pivot about the bearing 90 nor sway.

The clutch wheel 88 is of a construction including a driven gear 96, meshed to the intermediate gear 84 on the support shaft 86, and a pair of discs 98a and 98b positioned one above the other with the driven gear 96 held in position between said discs 98a and 98b. The discs 98a and 98b have respective hubs 100a and 100b integrally formed therewith and rotatably supported by the decks Db and Dc by means of associated bearings 102a and 102b. The clutch wheel 88 further includes fricton pads 104a and 104b respectively held in position between the disc 98a and the driven gear 96 and between the disc 98b and the driven gear 96 so that rotation of the driven gear 96 can be transmitted to the disc 98a through the friction pads 104a on one hand and also to the disc 98b through the friction pads 104b.

The up-down shift mechanism SM shown in FIG. 5 further comprises a cam assembly 106 of a construction similar to the cam assembly 62 shown in FIG. 4 and having a cam edge 106a as is the case with the cam assembly 62. This cam assembly 106 is rigidly secured to the hub 100b in coaxial relation thereto so that the disc 98b and the cam assembly 106 can rotate together.

Cooperative with the cam assembly 106 is a roller 108 rotatably supported by a fixed portion of the casing C and engaged with the cam edge 106a of the cam assembly 106 whereby, during the rotation of the cam assembly 106 about the longitudinal axis of the hub 100b, the cam assembly 106 can, depending upon the shape of the cam edge 106a, move up and down relative to the roller 108. The relative upward and downward movement of the cam assembly 106 is in turn transmitted to the triplex-decker and, therefore, the latter can move between the lifted and lowered positions along the guide posts 80. In particular, as best shown in FIG. 7, the cam edge 106a may be so shaped as to attain the following mode of movement during one complete rotation of the cam assembly 106 through 360°:

(I) During rotation of the cam assembly 106 through about 100° from its initial position, the triplex-decker is held in the lifted position as shown in FIG. 5.

(II) During a further rotation of the cam assembly 106 through about 40°, the triplex-decker is lowered to a position intermediate between the lifted and lowered positions and maintained thereat during a still further rotation of the cam assembly 106 through about 85°.

(III) At the time the cam assembly 106 has been rotated through abut 225° from its initial position, the triplex-decker starts to descend towards the lowered position and the triplex-decker attains the lowered position after the cam assembly 106 has been rotated through about 25° from a position about 225° spaced from the initial position of the cam assembly 106.

(IV) Immediately after the triplex-decker has attained the lowere position, it starts to elevate towards the lifted position.

It is to be noted that, during the rotation of the cam assembly 106, the support shaft 86 is also rotated about the longitudinal axis thereof with the rotational force of the drive gear 82 transmitted thereto through the intermediate gear 84 affixed to said support shaft 86.

The mechanism MM for moving the platform 60 in the circular path about the longitudinal axis of the support shaft 86 comprises a support sleeve 108 having one end on which the platform 60 is rigidly mounted, an upright rod 110 carried by the carriage 112, in a manner as will be described later, and inserted through the sleeve 108 so that the support sleeve 108 can rotate about the longitudinal axis of the upright rod 110.

The carriage 112 rigidly mounted on the top end of the support shaft 86 is in the form of a disc having a substantial thickness and having a substantially rectangular-sectioned recess 112a extending radially of the carriage 112 and having one end opening at the peripheral face of the carriage 112. The carriage 112 has a slot 112b defined therein and extending radially of the carriage 112 in parallel relationship to the longitudinal axis of the recess 112a and positioned intermediately of the width of the recess 112a. One end of said slot 112b opens in alignment with the open end of the recess 112a at the peripheral face of the carriage 112 while the other end terminates substantially in alignment with the longitudinal axis of the support shaft 86, that is, the center of rotation of the carriage 112.

Within the recess 112a, there is accommodated a slider 114 complimental in cross section to the cross sectional representation of the recess 112a and having one end situated within the recess 112a and the other end situated outside the recess 112a.

While the caraige 112 is constructed as hereinbefore decribed, the upright rod 112 on which the platform 60 is mounted through the support sleeve 108 downwardly extends through the slot 112b and is rigidly secured, or otherwise threaded to, the slider 114 so that the upright rod 110 and, therefore, the platform 60, can move together with the slider 114 which is reciprocately movable into and out of the recess 112a in a direction radially of the carriage 112.

The reciprocating mechanism RM for reciprocately moving the slider 114 into and out of the recess 112a in the carriage 112 comprises a substantially L-shaped pivot lever 116 having one end pivotally coupled to the outer end of the slider, 114 and the other end on which a roller 118 is rotatably mounted. In addition, a substantially intermediate bent portion of said lever 116 loosely extends through a bearing hole 92a in the carrier wheel 92 and is pivotally supported thereat by a pivot pin 120.

The reciprocating mechanism RM further comprises a guide block 124 of substantially triangular shape having a guide slope 124a to which the roller 118 carried by the lever 116 is engaged. This guide block 124 is rigidly mounted on a ring member 126 non-rotatably mounted on the support shaft 86 for axial sliding movement along said support shaft 86 and positioned within a space which is defined between the first and second decks Da and Db. It will readily be seen that, starting from the condition as shown in FIG. 5 and when the ring member 126 is upwardly moved along the support shaft 86, the roller 118 relatively descends the guide slope 124a of the guide block 124 with the pivot lever 116 consequently pivoting counterclockwise about the pivot pin 120 whereby the slider 114 is moved into the recess 112a. It is, therefore, clear that repeated upward and downward movement of the ring member 126 along the support shaft 86 results in correspondingly repeated movement of the slider 114 into and out of the recess 112a and the upright rod 110 and, therefore, the platform 60 can be reciprocated in the radial direction with respect to the center of the circle of the path of movement of the platform 60, that is, the longitudinal axis of the support shaft 86.

For effecting the upward and downward movement of the ring member 126 in the manner as hereinbefore described, the reciprocating mechanism RM further comprises a cam assembly 128 having a cam edge 128a. The cam assembly 128 is similar in construction to the cam assembly 106 and rigidly mounted on the hub 110a integral with the clutch disc 98aso that rotation of the clutch assembly 88 can be transmitted to said cam assembly 128. Cooperative with the cam edge 128a of the cam assembly 128 is a roller 130 rotatably carried by a support ring 132 which is positioned between the ring member 126 and the second deck Db and mounted on the support shaft 86 for axial and rotary movement about the longitudinal axis of the support shaft 86 independently of the rotation of the support shaft 86.

As is the case with the cam assembly 106 cooperative with the roller 108 for moving the triplex-decker between the lifted and lowered position as hereinbefore described, the cam assembly 128 cooperates with the roller 130 engaged to the cam edge 128for moving the support ring 132 up and down along the support shaft 86. The upward and downward movement of said support ring 132 is transmitted to the ring member 126 for effecting the reciprocating movement of the slider 114. It is to be noted that, in the construction so far described, the cam assemblies 106 and 128 are simultaneously rotated abut a common shaft 101 employed to connect the assemblies 88, 106 and 128 together and extending through the respective centers of the hubs 100a and 100b and the gear 96. Therefore, even though the triplex-decker is moved upward and downward during rotation of the cam assembly 106, the upward and downward movement of the support ring 132, that is, the reciprocating movement of the slider 114 resulting from rotation of the cam assembly 128 takes place independently of the upward and downward movement of the ring 132. Specifically, during the rotation of the carriage 112 together with the support shaft 86 accompanying the roller 118 then moving along a circular path about the longitudinal axis of the support shaft 86, the ring member 126 is also rotated about the longitudinal axis of the support shaft 86. This is possible because the roller 118 is of a construction having a groove on its outer peripheral face, ino which the guide slope 124a is engaged such that the circular movement of the roller 118 can be transmitted to the ring member 126 through the guide block 124.

For avoiding any possible rotation of the support ring 132 about the support shaft 86, a rod 134 extends from the support ring 132 through a slot 136a defined in a stopper 136 which is rigidly mounted on the second deck Db. The slot 136a extends in parallel relationship to the longitudinal axis of the support shaft 86 and has a width substantially equal to the diameter of the rod 134.

Furthermore, the platform arrangement shown in FIG. 5 further comprises means for avoiding any arbitrary rotation of the platform 60 about the longitudinal axis of the rod 110, which will now be described with particular reference to FIG. 6.

Referring to FIG. 6, there is illustrated a guide linkage system LS comprising first and second linkages 136 and 138 pivotally connected to each other in a manner as will subsequently be described. Each of the first and second linkages 136 and 138 is constituted by a pair of spaced links 136a and 136b or 138a and 138b. The links 136a and 136b have one end pivotally connected to a connecting member 140 and the other end pivotally connected to a connecting disc 142 while the links 138a and 138b have one end pivotally connected to the connecting disc 142 at a position about 90° spaced from the point of connection of the ends of the links 136a and 136b to the connecting disc 142 and the other end pivotally connected to a radially outwardly extending flange 108a integral with the sleeve 108 (FIG. 5). The connecting member 140 is rigidly mounted on the first deck Da as shown in FIG. 5 and upwardly extending therefrom in parallel relationship to the longitudinal axis of the shaft 86.

Rigidly mounted on the seocnd deck Db adjacent the free end of the rod 134 is a speed regulator 144 having an adjustable lever 144a. The adjustable lever 144a is so connected to the free end of the rod 134 that the lever 144a can be pivoted according to the upward and downward movement of the rod 134 incident to the upward and downward movement of the support ring 132. The speed regulator 144 is employed for regulating the rate of rotation of the drive shaft of the motor Mc and may be composed of a variable resistor having a movable tap. The resistor is inserted in an electric power supply circuit for the motor Mc while the movable tap is operatively coupled to the lever 144a. In any event, the speed regulator 144 is so designed that, depending upon the position of the rod 134 relative to the slot 136a, the rate of rotation of the drive shaft of the motor Mc can be varied.

Referring still to FIG. 5, there may be a possibility that the slider 114 will be moved into the recess 112a when an external force is applied to the platform 60 or the sleeve 108. In order to avoid this, the reciprocating mechanism RM may include means for biasing the slider 114 outwardly from the recess 112a with the roller 118 thus firmly engaged to the guide slope 124a. In the illustrated example, the biasing means is shown to be constituted by a compression spring 146 housed within the recess 112a. Instead of the compression spring 116, a tension spring or a leaf spring may be employed in which case it should be positioned such that the slider 114 can be urged to move out of the recess 112a in the carraige 112.

Shown in FIG. 8 is a chart showing a path of radial movement of the platform 60 represented by the shape of the cam edge 128a of the cam assembly 128 which is preferred to be employed in combination with the cam assembly 106 having the cam edge 106a so shaped as shown in FIG. 7. In any event, the present invention should not be limited to particular shapes of the respective cam edges 106a and 128a which may vary depending upon the desired contour of the whipped cream to be decorated on the cake.

Although the present invention has fully been described in connection with the preferred embodiments thereof, it is to be noted that various changes and modifications are apparent to those skilled in the art. By way of example, the platform arrangement of the construction shown in FIGS. 5 and 6 may be combined with the rotary dispensing nozzle assembly shown in FIG. 3. Moreover, the speed regulator 144 which has been described as employed in the platform arrangement of the construction shown in FIGS. 5 and 6 may equally be employed in the platform arrangement of the construction shown in FIG. 4 with no substantial modification required.

The invention being thus described. It will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A whipping machine for making an emulsified product from a mixture of a gas and a liquid milk product capable of forming a foam comprising:
   a housing structure including a container for accommodating a predetermined amount of liquid milk product;
   a first whipping barrel having a substantially labyrinth passage defined therein and extending over the entire length of said first whipping barrel, the mixture of gas and liquid milk product, which has been supplied under pressure into the first whipping barrel, being emulsified during its flow through the substantially labyrinth passage;
   means for supplying the liquid milk product within the container under pressure towards the first whipping barrel after the liquid milk product so supplied has been mixed with the gas;
   a second whipping barrel having one end coupled to the first whipping barrel and having therein means for stirring the emulsified mixture during the flow of said emulsified mixture therethrough;
   a dispensing nozzle assembly including a dispensing spout and a dispensing nozzle coupled to one end of said spout, the other end of said spout being coupled to the other end of the second whipping barrel;
   valve means including a dispensing valve positioned at the junction between the second whipping barrel and the dispensing spout for allowing the emulsified mixture to be discharged through the dispensing nozzle towards the outside of the machine during opening of the dispensing valve;
   a platform positioned immediately below the dispensing nozzle for the support of an article to be decorated with the emulsified product discharged from the dispensing nozzle; and
   means for moving the platform between lifted and lowered positions in a direction close to and away from the dispensing nozzle.

2. A whipping machine according to claim 1, wherein said moving means comprises a support rod having one end on which said platform is rigidly mounted, means for axially movably, but non-rotatably, supporting said support rod, a rotary cam assembly having a cam edge, a roller carried by said support rod and engaged to said cam edge, and a drive unit for rotating said cam assembly, said cam edge being so shaped that, during rotating of said cam assembly driven by said drive unit, the roller can be upwardly and downwardly moved with the movement of said roller being transmitted to the platform through the support rod.

3. A whipping machine according to claim 1, wherein said dispensing nozzle is rotatably connected to said dispensing spout and further comprising means for rotaing said dispensing nozzle about the longitudinal axis of said dispensing spout.

4. A whipping machine according to claim 2, wherein said dispensing nozzle is rotatably connected to said dispensing spout and further comprising means for rotating said dispensing nozzle about the longitudinal axis of said dispensing spout.

5. A whipping machine according to claim 1, further comprising means for moving the platform in a circular path so that the point of deposit of the emulsified product, which is discharged and falls by gravity from the dispensing nozzle, on the article to be decorated supported on the platform varies circularly, and means for reciprocating the platform during the continued movement of the platform in the circular path so that the point of deposit of the emulsified product on the article varies radially with respect to the circular path along which the platform is moved.

6. A whipping machine according to claim 5, wherein means for moving the platform in the circular path comprises a verticaly extending shaft, a disc-shaped carriage rigidly mounted on one end of said vertically extending shaft for rotation together with said vertically extending shaft, means for rotating said verticaly extending shaft, an upright rod having one end connected to said carriage with its longitudinal axis in offset relation to the longitudinal axis of the vertically extending shaft, a sleeve having one end on which the platform is rigidly mounted and receiving therein the other end portion of the upright rod, and means for avoiding any aribitrary rotation of the sleeve about the longitudinal axis of the upright rod.

7. A whipping machine according to claim 6, wherein the reciprocating means comprises a slider carried by said carriage for movement between retracted and projected positions in a direction perpendicular to the longitudinal axis of the verticaly extending shaft respectively into and out of a recess defined in said carriage, said one end of said upright rod being rigidly connected to said slider, a cam assembly having a cam edge, a support ring loosely mounted on the vertically extending shaft for axial movement along the vertically extending shaft, a roller carried by said support ring and engaged with said cam edge, a drive unit for rotating said cam assembly, said cam edge being so shaped that, uring rotation of said cam assembly driven by said drive unit, the roller can be upwardly and downwardly moved along the vertically extending shaft, and means for transmitting the upward and downward movement of the support ring to said slider so that the latter can be linearly moved between the retracted and projected position, said platform being radially inwardly moved as said slider is moved towards the retracted position while said slider being radially outwardly moved as said slider is moved towards the projected position from the retracted position.

8. A whipping machine according to claim 7, wherein both the drive unit for rotating the cam assembly and the means for rotating the vertically extending shaft are a common electric motor having a drive shaft, and further comprising a drive gear rigidly mounted on the drive shaft, an intermediate gear rigidly mounted on the other end of the vertically extending shaft and meshed to said drive gear, and a clutch assembly including a drive gear meshed to said intermediate gear and operatively coupled to said cam assembly.

9. A whipping machine according to claim 5, wherein said dispensing nozzle is rotatably connected to said dispensing spout and further comprising means for rotating said dispensing nozzle about the longitudinal axis of said dispensing spout.

10. A whipping machine according to claim 6, wherein said dispensing nozzle is rotatably connected to said dispensing spout and further comprising means for rotating said dispensing nozzle about the longitudinal axis of said dispensing spout.

11. A whipping machine according to claim 7, wherein said dispensing nozzle is rotatably connected to said dispensing spout and further comprising means for rotating said dispensing nozzle about the longitudinal axis of said dispensing spout.

12. A whipping machine according to claim 8, wherein said dispensing nozzle is rotatably connected to said dispensing spout and further comprising means for rotating said dispensing nozzle about the longitudinal axis of said dispensing spout.

13. A whipped cream making machine, wherein an article mounted on a platform is decorated with whipped cream discharged from a dispensing nozzle, comprising:
means for varying the relative position of the platform with respect to the dispensing nozzle to cause variations in the decoration.

14. A whipped cream making machine according to claim 13, wherein the platform is secured to be moved in a vortex motion and between lifted and lowered positions in a direction close to and away from the dispensing nozzle.

15. A whipped cream making machine according to claim 13, wherein the dispensing nozzle is secured to cause a circular motion and the platform is provided for being moved between lifted and lowered positions in a direction close to and away from the dispensing nozzle.

16. A whipped cream making machine according to claim 13, wherein the dispensing nozzle is secured to cause a circular motion and the platform is formed to cause a vortex motion and being moved between lited and lowered positions close to and away from the dispensing nozzle.

17. A whipped cream making machine according to claim 17, wherein means are further provided for reciprocating the platform during the continued movement of the platform so that the relative position between the platform and the dispensing nozzle varies radially with respect to a vortex path along which the platform is moved.

18. A whipped cream making machine according to claim 16, wherein means are further provided for reciprocating the platform during the continued movement of the platform so that the relative position between the platform and the dispensing nozzle varies radially with respect to a vortex path along whith the platform is moved.

19. A whipped cream making machine, wherein an article mounted on a platform is decorated with whipped cream discharged from a dispensing nozzle, comprising:
means for varying the relative position of the platform with respect to the dispensing nozzle; and
said varying means further including means for rotating at least one of said platform and the dispensing nozzle and moving at least one of said platform and the dispensing nozzle between lifted and lowered positions in a direction close to and away from each other.

* * * * *